United States Patent
Seo et al.

(10) Patent No.: US 11,545,022 B2
(45) Date of Patent: Jan. 3, 2023

(54) IMAGE DISPLAY APPARATUS FOR DETECTING BATTERY CONDITION OF REMOTE CONTROL DEVICE AND METHOD THEREOF

(71) Applicant: LG ELECTRONICS INC., Seoul (KR)

(72) Inventors: Gwanhui Seo, Seoul (KR); Sangjin Ahn, Seoul (KR); Sanghyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/318,787

(22) Filed: May 12, 2021

(65) Prior Publication Data

US 2021/0358289 A1    Nov. 18, 2021

(30) Foreign Application Priority Data

May 18, 2020    (KR) ......................... 10-2020-0059156

(51) Int. Cl.
  *G08B 21/18*    (2006.01)
  *G06F 3/147*    (2006.01)
(52) U.S. Cl.
  CPC ........... *G08B 21/182* (2013.01); *G06F 3/147* (2013.01)

(58) Field of Classification Search
  CPC .............................. G08B 21/182; G06F 3/147
  See application file for complete search history.

(56) References Cited

U.S. PATENT DOCUMENTS

2009/0278701 A1 * 11/2009 Reams ............... G01R 31/3835
                                                                  340/636.15

* cited by examiner

*Primary Examiner* — Hongmin Fan
(74) *Attorney, Agent, or Firm* — Lee Hong Degerman Kang & Waimey

(57) ABSTRACT

The present disclosure relates to an image display apparatus and a method thereof. The image display apparatus according to an embodiment of the present disclosure comprises: a display; an external device interface including at least one communication module, the external device being configured to communicate with a remote control device using short-range communication; a memory; and a controller configured to: check a voltage value of a battery included in the remote control device based on data included in a control signal received from the remote control device; when the voltage value of the battery is less than a predetermined reference voltage value, store the voltage value of the battery in the memory, and output a first message for requesting battery replacement through the display; when the control signal includes data indicating that the battery is replaced, calculate a voltage difference between a voltage value stored in the memory and the voltage value included in the control signal; and when the voltage difference is less than a predetermined reference difference, determine that the replaced battery needs to be replaced.

9 Claims, 11 Drawing Sheets

IMAGE DISPLAY APPARATUS FOR DETECTING BATTERY CONDITION OF REMOTE CONTROL DEVICE AND METHOD THEREOF

CROSS-REFERENCE TO RELATED APPLICATIONS

Pursuant to 35 U.S.C. § 119 (a), this application claims the benefit of an earlier filing date and right of priority to Korean Patent Application No. 10-2020-0059156 filed on May 18, 2020, the contents of which is hereby incorporated by reference herein in its entirety.

BACKGROUND OF THE INVENTION

Field of the Disclosure

The present disclosure relates to an image display apparatus and method thereof.

Description of the Related Art

An image display apparatus is an apparatus having a function of displaying an image that can be watched by a user, and the user can watch a broadcast through the image display apparatus. For example, the image display apparatus may include a Television TV having a liquid crystal display LCD using liquid crystal or an OLED display using an organic light emitting diode OLED.

In recent years, digital TV services using wired or wireless communication networks are becoming more common, and digital TV services provide a variety of services that cannot be provided by conventional analog broadcasting services.

Meanwhile, a remote control device is a device capable of remotely controlling the image display device, and transmits a signal (hereinafter, referred to as a control signal) including a command corresponding to a user manipulation to the image display device.

In general, in order to improve user convenience, the remote control device operates by power supplied from a battery provided therein, and transmits a control signal to the image display device using wireless communication. In this case, when the remaining power of the battery of the remote control device is low below a certain level, the remote control device cannot properly transmit the control signal to the image display device because power required for operation is not supplied from the battery. For this reason, in a conventional remote control device, it is common to notify the user of information on the remaining power of the battery of the remote control device or a request for battery replacement, using elements such as Light Emitting Diode (LED) provided in the remote control device.

In this case, when the user replaces a used battery mounted in the remote control device with a new battery, it is easy for the user to confuse the old battery with the new battery if the manufacturer and appearance of the new battery and the used battery are the same. In addition, it frequently occurs that the used battery is re-mounted in the remote control device. For this reason, until the new battery is mounted in the remote control device, the user may be inconvenient in having to repeatedly replace the battery.

Also, depending on specifications of the remote control devices, types of batteries recommended for use in each remote control device (e.g., alkaline batteries, manganese batteries, etc.) may be different. In this case, if a battery other than a battery which type is a recommended type for use is mounted, the remote control device may not operate, or even if it operates, power of the battery of the remote control device may be rapidly consumed. However, even if the battery other than the battery which type is the recommended type for use is mounted in the remote control device, there is a high possibility that the user may not recognize the fact, and simply determine that the remote control device is faulty or that the remaining power of the battery is insufficient.

SUMMARY

It is an object of the present disclosure to solve the above and other problems.

It is another object of the present disclosure to provide an image display apparatus and method thereof that may determine when to replace a battery mounted in the remote control device and whether the replaced battery is a used battery, It is another object of the present disclosure to provide an image display apparatus and method thereof that may determine whether a type of the battery mounted in the remote control device is a type recommended for use.

In accordance with an aspect of the present disclosure, an image display apparatus may comprise: a display; an external device interface including at least one communication module, the external device being configured to communicate with a remote control device using short-range communication; a memory; and a controller configured to: check a voltage value of a battery included in the remote control device based on data included in a control signal received from the remote control device; when the voltage value of the battery is less than a predetermined reference voltage value, store the voltage value of the battery in the memory, and output a first message for requesting battery replacement through the display; when the control signal includes data indicating that the battery is replaced, calculate a voltage difference between a voltage value stored in the memory and the voltage value included in the control signal; and when the voltage difference is less than a predetermined reference difference, determine that the replaced battery needs to be replaced.

In accordance with an aspect of the present disclosure, a method of an image display apparatus is provided. The method comprises: checking a voltage value of a battery included in a remote control device based on data included in a control signal received from the remote control device; when the voltage value of the battery is less than a predetermined reference voltage value, storing the voltage value of the battery in a memory of the image display apparatus, and outputting a first message for requesting battery replacement through a display of the image display apparatus; when the control signal includes data indicating that the battery is replaced, calculating a voltage difference between a voltage value stored in the memory and the voltage value included in the control signal; and when the voltage difference is less than a predetermined reference difference, determining that the replaced battery needs to be replaced.

According to the present disclosure, the image display apparatus and method thereof have the following effects.

According to various embodiments of the present disclosure, based on data included in a control signal received from the remote control device, a voltage value of the battery of the remote control device may be checked to determine a replacement time of the battery. In addition, by comparing the voltage value of the battery before replacement and the voltage value of the battery after replacement, it is possible to determine whether the replaced battery is the used battery. Through this, information on a state of the battery can be accurately provided to the user, and the usability and reliability of the product can be improved.

Furthermore, according to various embodiments of the present disclosure, based on the degree of change in voltage of the replaced battery for a predetermined period of time, it is possible to determine whether the type of the replaced battery is a type recommended for use, and request the user to replace the battery mounted in the remote control device, thereby further improving the reliability of the product.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

DESCRIPTION OF EXEMPLARY EMBODIMENTS

Figure 1:
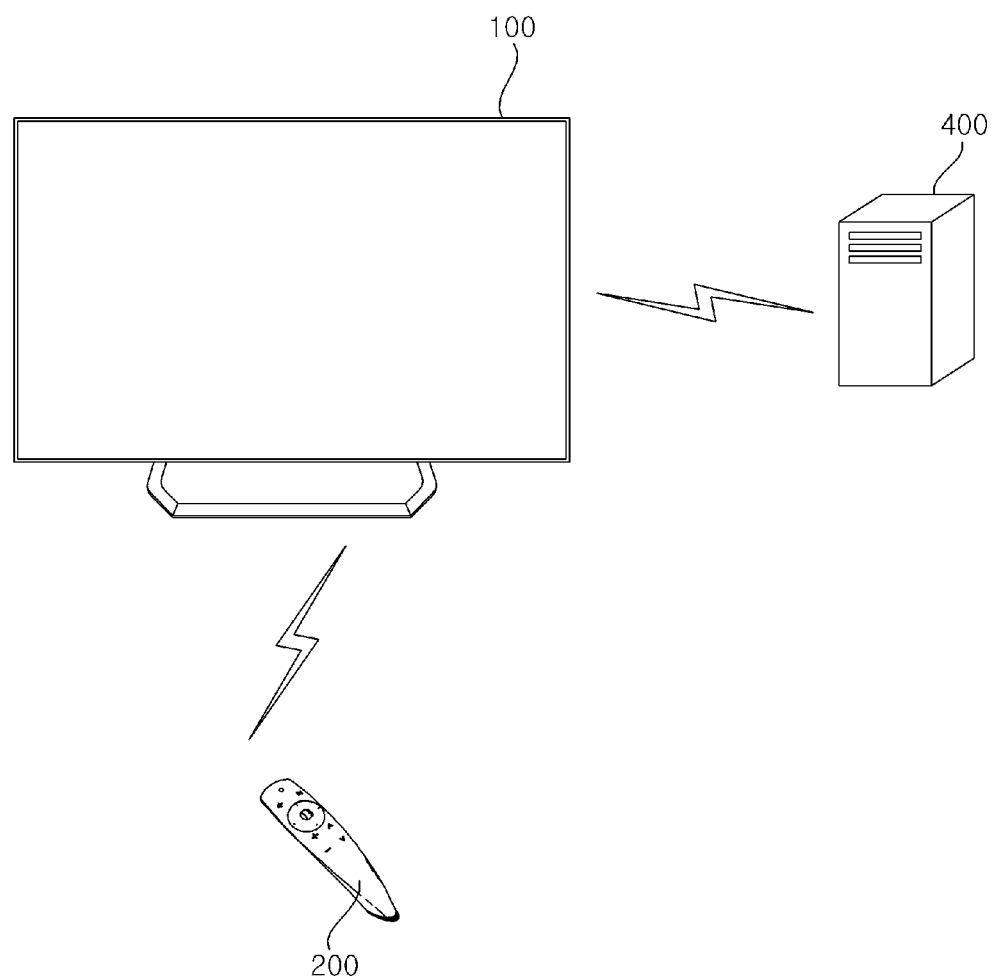
FIG. 1 is a diagram illustrating an image display system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

FIG. 1 is a diagram illustrating an image display system according to an embodiment of the present disclosure.

Referring to FIG. 1, an image display system 10 may include an image display apparatus 100 and/or a remote control device 200.

The image display apparatus 100 may be an apparatus that processes and outputs an image. The image display apparatus 100 is not particularly limited such as a TV, a notebook computer, a monitor, and the like as long as it can output a screen corresponding to an image signal.

The image display apparatus 100 may receive a broadcast signal, signal-process the broadcast signal, and output a signal-processed broadcast image. When the image display apparatus 100 receives a broadcast signal, the image display apparatus 100 may correspond to a broadcast reception device.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100 and transmits various control signals to the image display apparatus 100 through the established network, or receives a signal related to various operations processed by the image display apparatus 100 from the image display apparatus 100.

For example, various input devices, such as a mouse, a keyboard, a space remote controller, a trackball, a joystick, and the like may be used as the remote control device 200. The remote control device 200 may be referred to as an external device, and hereinafter, it should be noted that an external device and a remote control device can be mixed and used, if necessary.

The image display apparatus 100 may be connected to only a single remote control device 200, or connected to two or more remote control devices 200 at the same time, and may change the object displayed on a screen or adjust the state of the screen, based on a control signal provided from each remote control device 200.

Meanwhile, the image display system 10 may further include at least one server 400. The image display apparatus 100 may transmit and receive data between the server 400 and each other. For example, the image display apparatus 100 may transmit and receive data to and from the server 400 through a network such as the Internet.

The image display apparatus 100 may transmit data related to an operation performed according to a user input to the server 400, and the server 400 may store data received from the image display apparatus 100.

Figure 2:
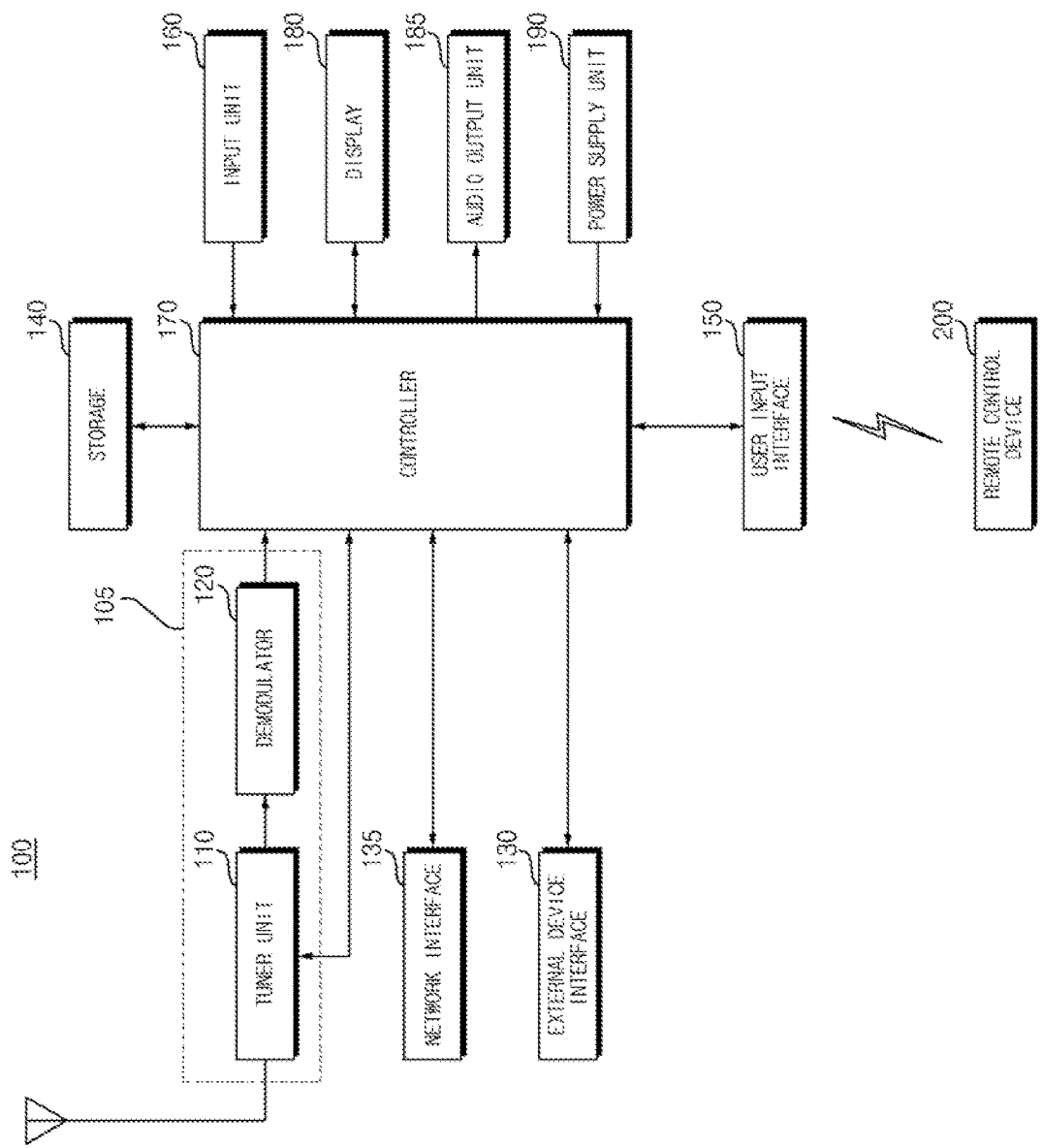
FIG. 2 is an internal block diagram of the image display apparatus of FIG. 1.

FIG. 2 is an internal block diagram of the image display apparatus of FIG. 1.

Referring to FIG. 2, the image display apparatus 100 may include a broadcast reception unit 105, an external device interface 130, a network interface 135, a storage unit 140, a user input interface 150, an input unit 160, a controller 170, a display 180, an audio output unit 185 and/or a power supply unit 190.

The broadcast reception unit 105 may include a tuner 110 and a demodulation unit 120.

Meanwhile, unlike the drawing, it is also possible that the image display apparatus 100 includes only the broadcast reception unit 105, and the external device interface 130, among the broadcast reception unit 105, the external device interface 130, and the network interface 135. That is, the image display apparatus 100 may not include the network interface 135.

The tuner 110 may select a broadcast signal corresponding to a channel selected by a user or all previously stored channels from among broadcast signals received through an antenna or a cable. The tuner 110 may convert the selected broadcast signal into an intermediate frequency signal, a baseband image, or an audio signal.

For example, if the selected broadcast signal is a digital broadcast signal, the tuner 110 may convert the digital broadcast signal into a digital IF signal (DIF). If the selected broadcast signal is an analog broadcast signal, the tuner 110 may convert the analog broadcast signal into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the controller 170.

Meanwhile, the tuner 110 may sequentially select broadcast signals of all broadcast channels stored through a channel memory function among received broadcast signals, and convert the broadcast signals into an intermediate frequency signal, a baseband image, or an audio signal.

Meanwhile, the tuner 110 may include a plurality of tuners in order to receive broadcast signals of a plurality of channels. Alternatively, a single tuner that simultaneously receives broadcast signals of multiple channels may be provided.

A demodulation unit 120 may perform a demodulation operation by receiving the digital IF signal DIF converted by the tuner 110.

The demodulation unit 120 may output a stream signal TS after performing demodulation and channel decoding. In this situation, the stream signal may be a signal which is obtained by multiplexing an image signal, an audio signal, or a data signal.

The stream signal output from the demodulation unit 120 may be input to the controller 170. After performing demultiplexing, image/audio signal processing, and the like, the controller 170 may output an image through the display 180 and output an audio through the audio output unit 185.

The external device interface 130 may transmit or receive data with a connected external device. To this end, the external device interface 130 may include an A/V input/output unit.

The external device interface 130 may be connected to an external device such as a digital versatile disk (DVD), a Blu ray, a game device, a camera, a camcorder, a computer (laptop), a set-top box, and the like by wire/wireless, and may perform input/output operations with the external device.

In addition, the external device interface 130 communicates with various remote control device 200 as shown in FIG. 1, and may receive a control signal related to the operation of the image display apparatus 100 from the remote control device 200, or may transmit data related to the operation of the image display apparatus 100 to the remote control device 200.

An A/V input/output unit may receive image and audio signals from an external device. For example, the A/V input/output unit may include an Ethernet terminal, a USB terminal, CVBS (Composite Video Banking Sync) terminal, component terminal, S-video terminal (analog), DVI (Digital Visual Interface) terminal, HDMI (High Definition Multimedia Interface) terminal, MHL (Mobile High-definition Link) terminal, RGB terminal, D-SUB terminal, IEEE 1394 terminal, SPDIF terminal, Liquid HD terminal, and the like. Digital signals input through these terminals may be transmitted to the controller 170. In this situation, the analog signal input through the CVBS terminal and the S-video terminal may be converted into a digital signal through an analog-digital converter and transmitted to the controller 170.

The external device interface 130 may include a wireless communication unit for short-range wireless communication with other electronic device. Through such a wireless communication unit, the external device interface 130 may exchange data with an adjacent mobile terminal. In particular, in a mirroring mode, the external device interface 130 may receive device information, executed application information, application images, and the like from the mobile terminal.

The external device interface 130 may perform short-range wireless communication using Bluetooth, Radio Frequency Identification (RFID), Infrared communication (IrDA, infrared Data Association), UWB (Ultra-Wideband), ZigBee, or the like.

The network interface 135 may provide an interface for connecting the image display apparatus 100 to a wired/wireless network including an Internet network.

Meanwhile, the network interface 135 may include a communication module for connection with a wired/wireless network. For example, the network interface 135 may include a communication module for wireless LAN (WLAN) (Wi-Fi), wireless broadband (Wibro), Wimax (World Interoperability for Microwave Access), HSDPA (High Speed Downlink Packet Access), or the like.

The network interface 135 may transmit or receive data with other users or other electronic devices through a connected network or another network linked to the connected network.

The network interface 135 may receive web content or data provided by a content provider or a network operator. That is, the network interface 135 may receive content such as movies, advertisements, games, VODs, broadcasts, and related information provided from the content provider or the network provider through the network.

The network interface 135 may receive update information and an update file of firmware provided by the network operator, and may transmit data to the content provider or the network operator.

The network interface 135 may select and receive a desired application from among applications open to the public through the network.

The storage unit 140 may store a program for processing and controlling each signal in the controller 170 or may store a signal-processed image, audio, or data signal. For example, the storage unit 140 may store application programs designed for performing various tasks that can be processed by the controller 170, and may provide some of the stored application programs selectively when requested by the controller 170.

Program, or the like stored in the storage unit 140 is not particularly limited as long as they can be executed by the controller 170.

The storage unit 140 may perform a function for temporary storage of an image, audio, or data signal received from an external device through the external device interface 130.

The storage unit 140 may store information on a certain broadcast channel, through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of volatile memory (e.g. DRAM, SRAM, SDRAM, etc.), and nonvolatile memory (e.g. flash memory, hard disk drive HDD, and solid-state drive SSD, etc.). In various embodiments of the present disclosure, the storage unit 140 and a memory may be used interchangeably.

The user input interface 150 may transmit a signal input by the user to the controller 170, or may transmit a signal from the controller 170 to the user.

For example, the user input interface 150 may transmit/receive a user input signal such as power on/off, channel selection, and screen setting from the remote control device 200, transmit a user input signal input from a local key such as a power key, a channel key, a volume key, and a setting key to the controller 170, transmit a user input signal input from a sensor unit that senses a user's gesture to the controller 170, or transmit a signal from the controller 170 to a sensor unit.

The input unit 160 may be provided in one side of the main body of the image display apparatus 100. For example, the input unit 160 may include a touch pad, a physical button, or the like.

The input unit 160 may receive various user commands related to the operation of the image display apparatus 100, and may transmit a control signal corresponding to the input command to the controller 170.

The input unit 160 may include at least one microphone, and may receive a user's voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or another hardware-based processor.

The controller 170 may demultiplex the stream input through the tuner 110, the demodulation unit 120, the external device interface 130, or the network interface 135, or may generate and output a signal for image or audio output by processing demultiplexed signals.

The display 180 may generate a driving signal by converting the data signal, the OSD signal, the control signal, the image signal processed by the controller 170, or the data signal, the control signal, the image signal received from the external device interface 130, or the like.

The display 180 may include a display panel including a plurality of pixels.

A plurality of pixels provided in a display panel may include a RGB subpixel. Alternatively, a plurality of pixels included in a display panel may include a RGBW subpixel. The display 180 may generate a driving signal for a plurality of pixels, by converting the image signal, the data signal, the OSD signal, the control signal, and the like processed by the controller 170.

The display 180 may be a Plasma Display Panel (PDP), a Liquid Crystal Display (LCD), an Organic Light Emitting Diode (OLED), a flexible display, or the like and may also be a 3D display. The 3D display 180 may be classified into a glasses-free type and a glasses type.

Meanwhile, the display 180 may be configured as a touch screen and used as an input device in addition to an output device.

The audio output unit 185 receives an audio-processed signal from the controller 170 and outputs as an audio.

The image signal image-processed by the controller 170 may be input to the display 180 and displayed as an image corresponding to a pertinent image signal. In addition, the image signal image-processed by the controller 170 may be input to an external output device through the external device interface 130.

The audio signal processed by the controller 170 may be output as an audio to the audio output unit 185. In addition, the audio signal processed by the controller 170 may be transmitted to an external output device through the external device interface 130.

Although not shown in FIG. 2, the controller 170 may include a demultiplexer, an image processing unit, and the like. This will be described later with reference to FIG. 3.

In addition, the controller 170 may control the overall operation of the image display apparatus 100. For example, the controller 170 may control the tuner 110 to select (tune) a channel selected by a user or a broadcast corresponding to a previously stored channel.

In addition, the controller 170 may control the image display apparatus 100 according to a user command input through the user input interface 150 or an internal program.

Meanwhile, the controller 170 may control the display 180 to display an image. In this situation, the image displayed on the display 180 may be a still image or a moving image, and may be a 2D image or a 3D image.

Meanwhile, the controller 170 may display a certain 2D object within an image displayed on the display 180. For example, the object may be at least one of an accessed web screen (newspaper, magazine, etc.), an electronic program guide (EPG), various menus, widget, icon, still image, moving image, and text.

Meanwhile, the image display apparatus 100 may further include a photographing unit. The photographing unit may photograph a user. The photographing unit may be implemented with one camera, but is not limited thereto, and may be implemented with a plurality of cameras. Meanwhile, the photographing unit may be embedded in the image display apparatus 100 on the display 180 or may be separately disposed. Image information photographed by the photographing unit may be input to the controller 170.

The controller 170 may recognize a user's location, based on the image photographed by the photographing unit. For example, the controller 170 may determine a distance (z-axis coordinate) between the user and the image display apparatus 100. In addition, the controller 170 may determine the x-axis coordinates and the y-axis coordinates in the display 180 corresponding to the user location.

The controller 170 may detect a user's gesture based on the image photographed by the photographing unit, or each of signals detected by the sensor unit or a combination thereof.

The power supply unit 190 may supply corresponding power throughout the image display apparatus 100. In particular, the power supply unit 190 may supply power to the controller 170 that can be implemented in the form of a System On Chip (SOC), the display 180 for displaying an image, the audio output unit 185 for outputting audio, and the like.

Specifically, the power supply unit 190 may include a converter for converting AC power into DC power, and a DC/Dc converter for converting the level of DC power.

The remote control device 200 may transmit a user input to the user input interface 150. To this end, the remote control device 200 may use Bluetooth, Radio Frequency (RF) communication, Infrared Radiation communication, Ultra-wideband (UWB), ZigBee, and the like. In addition, the remote control device 200 may receive an image, audio, or data signal output from the user input interface 150, and display it on the remote control device 200 or output as an audio.

Meanwhile, the above-described image display apparatus 100 may be a digital broadcast receiver capable of receiving a fixed or mobile digital broadcast.

Meanwhile, the block diagram of the image display apparatus 100 shown in FIG. 2 is just a block diagram for an embodiment of the present disclosure, and each component of the block diagram can be combined, added, or omitted in accordance with the specifications of the image display apparatus 100 that is actually implemented.

That is, if necessary, two or more components may be combined into a single component, or one component may be subdivided into two or more components. In addition, the functions performed in each block are for explaining the embodiment of the present disclosure, and a specific operation or device thereof does not limit the scope of the present disclosure.

Figure 3:
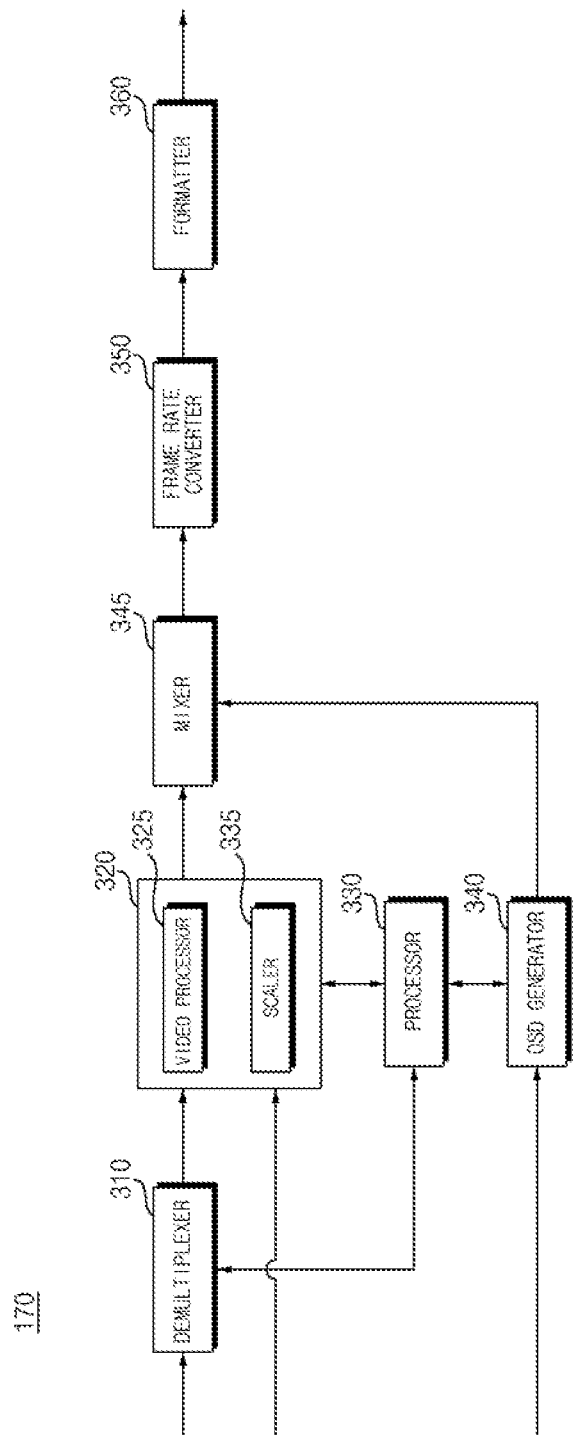
FIG. 3 is an internal block diagram of a controller of FIG. 2.

FIG. 3 is an internal block diagram of a controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit and a data processing unit may be further included.

The demultiplexer 310 may demultiplex an input stream. For example, when an MPEG-2 TS is input, it can be demultiplexed and separated into image, audio, and data signal, respectively. Here, the stream signal input to the demultiplexer 310 may be a stream signal output from the tuner 110, the demodulation unit 120, or the external device interface 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include decoders of various standards. For example, the image decoder 325 may include an MPEG-2, H.264 decoder, a 3D image decoder for color image and depth image, a decoder for multiple view images, and the like.

The processor 330 may control overall operation within the image display apparatus 100 or within the controller 170. For example, the processor 330 may control the tuner 110 to select (tune) a broadcast corresponding to a channel selected by a user or a previously stored channel.

In addition, the processor 330 may control the image display apparatus 100 according to a user command input through the user input interface 150 or an internal program.

In addition, the processor 330 may control data transmission with the network interface 135 or the external device interface 130.

Further, the processor 330 may control operation of the demultiplexer 310, the image processing unit 320, and the OSD generator 340 in the controller 170.

The OSD generator 340 may generate an OSD signal by itself or according to a user input. For example, the OSD generator 340 may generate a signal for displaying various types of information on the screen of the display 180 as a graphic or text, based on a user input signal input through the input unit 160.

The generated OSD signal may include various data such as a user interface screen, various menu screens, widgets, icons, and the like of the image display apparatus 100. In addition, the generated OSD signal may include a 2D object or a 3D object.

In addition, the OSD generator 340 may generate a pointer that can be displayed on the display 180, based on a pointing signal input from the remote control device 200. The OSD generator 340 may include a pointing signal processing unit that generates a pointer. The pointing signal processing unit may not be provided in the OSD generator 340 and may be provided separately.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly without additional frame rate conversion.

The formatter 360 may arrange a left-eye image frame and a right-eye image frame of a frame rate-converted 3D image. In addition, the formatter 360 may output a synchronization signal Vsync for opening the left-eye glass and the right-eye glass of a 3D viewing device.

Meanwhile, the formatter 360 may convert the format of an input image signal into an image signal for display on the display 180 and output it.

In addition, the formatter 360 may change the format of the 3D image signal. For example, the formatter 360 may change the format of the 3D image signal into any one format among various 3D formats such as Side by Side format, Top/Down format, Frame Sequential format, Interlaced format, Checker Box format, and the like.

Meanwhile, the formatter 360 may convert a 2D image signal into a 3D image signal. For example, according to a 3D image generation algorithm, the formatter 360 may detect an edge or a selectable object in a 2D image signal, and separate and generate into a 3D image signal by the object according to the detected edge or the selectable object. At this time, the generated 3D image signal may be separated and arranged into a left-eye image signal L and a right-eye image signal R, as described above.

Meanwhile, although not shown in the drawing, after the formatter 360, a 3D processor for processing a 3-dimensional (3D) effect signal may be further disposed. Such a 3D processor may process brightness, tint, and color adjustment of an image signal in order to improve a 3D effect. For example, it is possible to perform signal processing, or the like to make the near clear and the far blurry. Meanwhile, the functions of the 3D processor may be merged into the formatter 360 or within the image processing unit 320.

Meanwhile, an audio processing unit in the controller 170 may perform audio processing of a demultiplexed audio signal. To this end, the audio processing unit may include various decoders.

In addition, the audio processing unit in the controller 170 may process a base, a treble, a volume control, and the like.

The data processing unit in the controller 170 may perform data processing of the demultiplexed data signal. For example, when the demultiplexed data signal is an encoded data signal, it may be decoded. The encoded data signal may be electronic program guide information including broadcasting information such as a start time and an end time of a broadcast program aired on each channel.

Meanwhile, the block diagram of the controller 170 shown in FIG. 3 is just a block diagram for an embodiment of the present disclosure, and each component of the block diagram may be integrated, added, or omitted according to the specifications of the actually implemented controller 170.

In particular, the frame rate converter 350 and the formatter 360 are not provided in the controller 170, but may be separately provided respectively or may be provided separately as a single module.

Figure 4:
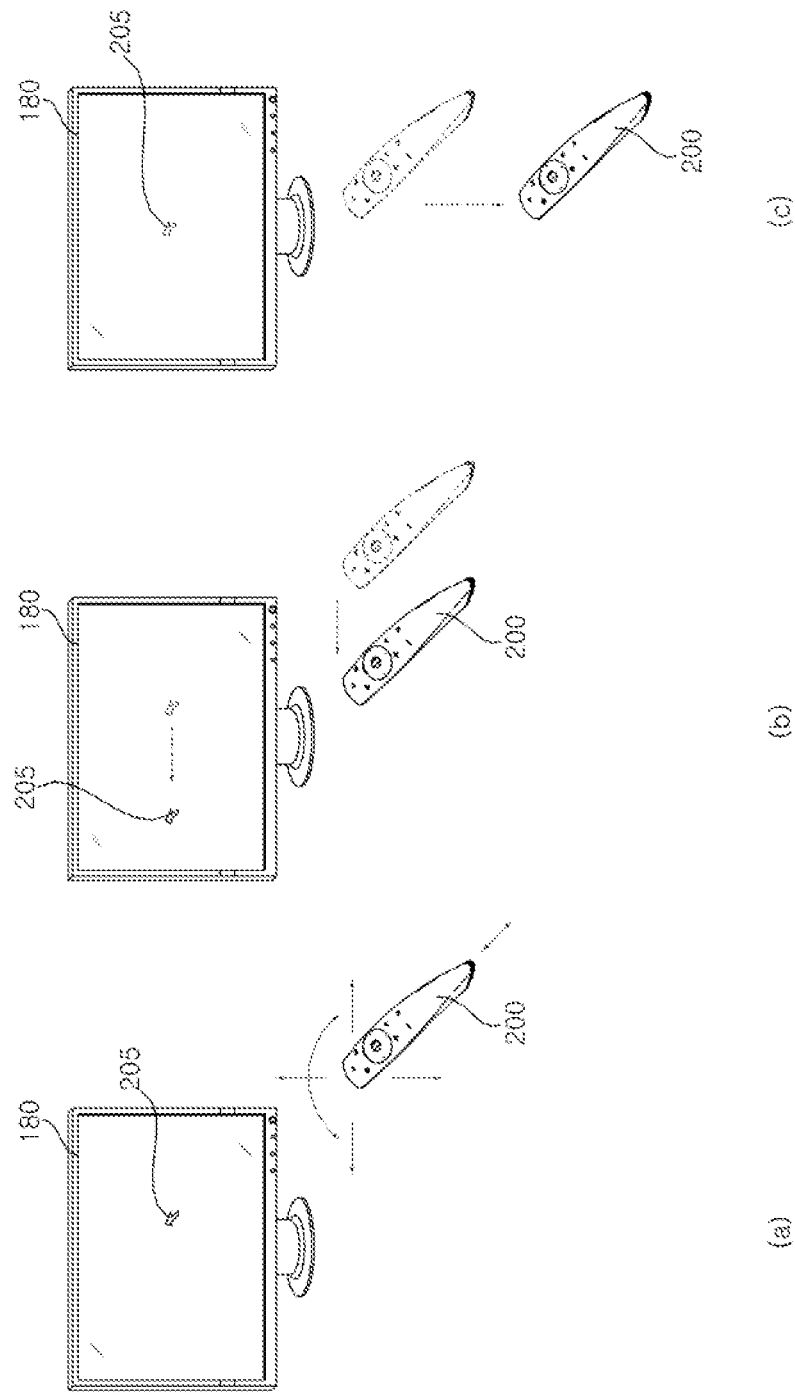
FIG. 4 is a diagram illustrating a control method of the remote control device of FIG. 2.

FIG. 4 is a diagram illustrating a control method of the remote control device of FIG. 2;

As shown in FIG. 4A, a pointer 205 corresponding to the remote control device 200 may be displayed on the display 180.

The user can move or rotate the remote control device 200 up and down, left and right (FIG. 4B), back and forth (FIG. 4C). The movement of the pointer 205 displayed on the display 180 of the image display apparatus may correspond to the movement of the remote control device 200. As shown in the drawing, the remote control device 200 may allow a corresponding pointer 205 to move and be displayed according to movement in a 3D space, and thus may be referred to as a space remote controller or a 3D pointing device.

FIG. 4B illustrates that when a user moves the remote control device 200 to the left, the pointer 205 displayed on the display 180 of the image display apparatus 100 also moves to the left in response thereto.

Information on the movement of the remote control device 200 detected through a sensor of the remote control device 200 may be transmitted to the image display apparatus 100. The image display apparatus 100 may calculate the coordinate of the pointer 205 from information related to the movement of the remote control device 200. The image display apparatus 100 may display a pointer 205 to correspond to the calculated coordinates.

FIG. 4C illustrates a case in which a user moves the remote control device 200 away from the display 180 while pressing a specific button in the remote control device 200. Accordingly, the selection area in the display 180 corresponding to the pointer 205 may be zoomed-in to be displayed in an enlarged manner. On the other hand, when the user moves the remote control device 200 closer to the display 180, the selection area in the display 180 corresponding to the pointer 205 may be zoomed-out to be displayed in a reduced size.

Meanwhile, when the remote control device 200 moves away from the display 180, the selection area may be zoomed-out, and when the remote control device 200 approaches the display 180, the selection area may be zoomed-in.

Meanwhile, when a specific button in the remote control device 200 is pressed, the image display apparatus 100 may exclude the determination of the up, down, left and right movements of the remote control device 200. That is, when the remote control device 200 moves away from or approaches the display 180, the up, down, left, and right movements are not determined, but only forward and backward movements may be determined. When a specific button in the remote control device 200 is not pressed, only the pointer 205 may be moved and displayed according to the up, down, left, and right movements of the remote control device 200.

Meanwhile, the moving speed or moving direction of the pointer 205 may correspond to the moving speed or moving direction of the remote control device 200.

Figure 5:
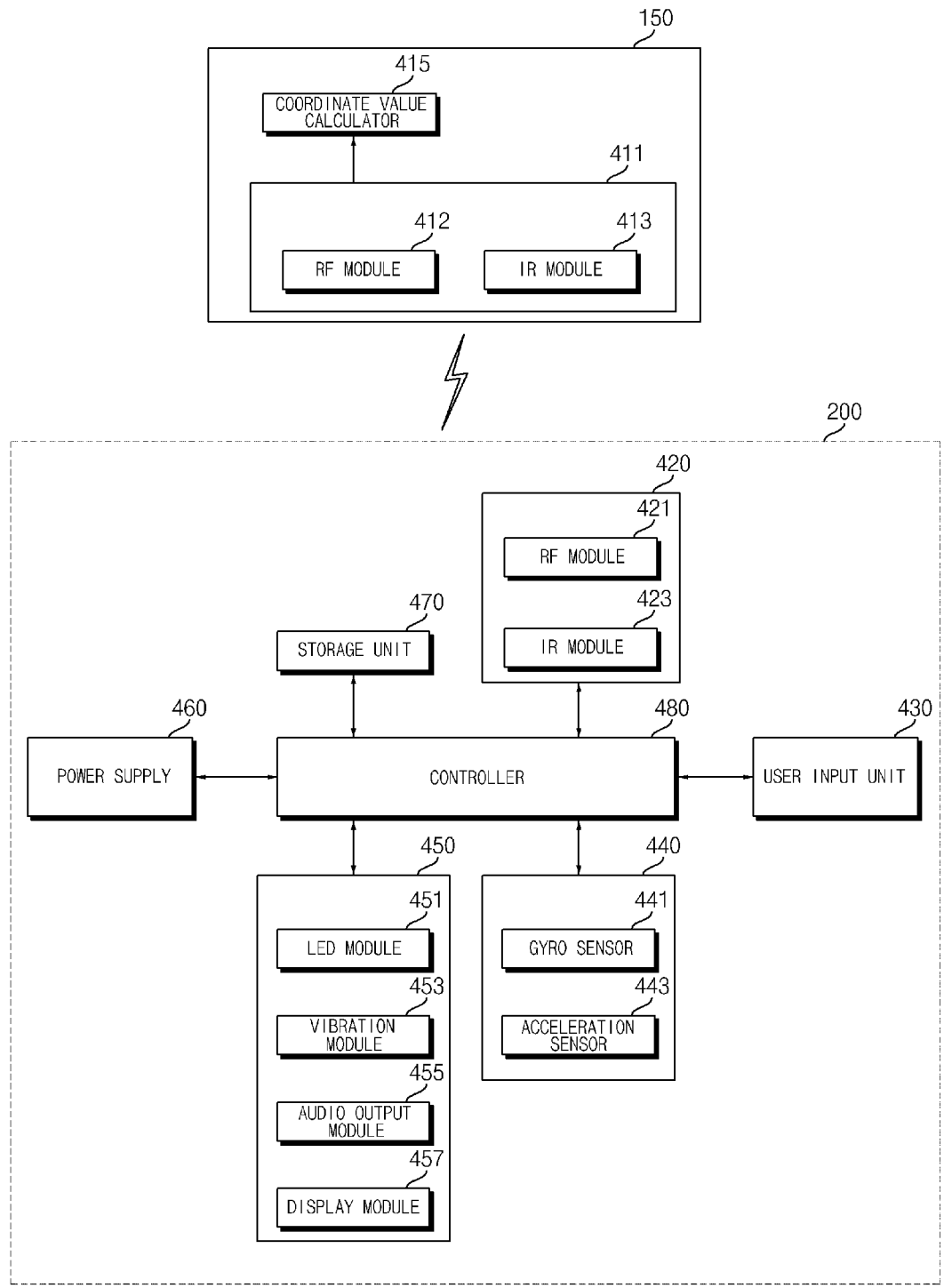
FIG. 5 is an internal block diagram of the remote control device of FIG. 2.

FIG. 5 is an internal block diagram of the remote control device of FIG. 2;

Referring to FIG. 5, the remote control device 200 may include a wireless communication unit 420, a user input unit 430, a sensor unit 440, an output unit 450, a power supply 460, a storage unit 470, and/or a controller 480.

The wireless communication unit 420 may transmit/receive a signal to/from any one of the image display apparatuses according to the embodiments of the present disclosure described above.

In the present embodiment, the remote control device 200 may include an RF module 421 for transmitting and receiving signals to and from the image display apparatus 100 according to a RF communication standard. In addition, the remote control device 200 may include an IR module 423 for transmitting and receiving signals to and from the image display apparatus 100 according to an IR communication standard.

The remote control device 200 may transmit a signal containing information on the motion of the remote control device 200 to the image display apparatus 100 through the RF module 421. The remote control device 200 may receive the signal transmitted by the image display apparatus 100 through the RF module 421.

The remote control device 200 may transmit a command related to power on/off, channel change, volume change, and the like to the image display apparatus 100 through the IR module 423.

The user input unit 430 may be implemented by a keypad, a button, a touch pad, a touch screen, or the like. The user may operate the user input unit 430 to input a command related to the image display apparatus 100 to the remote controller 200.

When the user input unit 430 includes a hard key button, the user can input a command related to the image display apparatus 100 to the remote control device 200 through a push operation of the hard key button.

When the user input unit 430 includes a touch screen, the user may touch a soft key of the touch screen to input the command related to the image display apparatus 100 to the remote controller 200.

In addition, the user input unit 430 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information on the motion of the remote controller 200.

The gyro sensor 441 may sense information on the operation of the remote control device 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 430 or a signal transmitted from the image display apparatus 100. Through the output unit 450, the user may recognize whether the user input unit 430 is operated or whether the image display apparatus 100 is controlled.

The output unit 450 may include an LED module 451 including at least one light emitting device (e.g., Light Emitting Diode (LED)), a vibration module 453 for generating a vibration, an audio output module 455 for outputting an audio, and/or a display module 457 for outputting an image.

The power supply 460 may supply power to each component provided in the remote control device 200. The power supply 460 may include at least one battery.

When the movement of the remote control device 200 through the sensor unit 440 is not detected for a predetermined time, the power supply unit 460 may stop supplying power to the each component provided in the remote control device 200 to reduce unnecessary power consumption.

When a predetermined event occurs, the power supply unit 460 may resume supplying power to the each component provided in the remote control device 200. For example, when a predetermined key provided in the remote control device 200 is operated, the power supply unit 460 may resume power supply to the each component. For example, when the movement of the remote control device 200 is detected through the sensor unit 440, the power supply unit 460 may resume supplying power to the each component provided in the remote control device 200.

The storage unit 470 may store various types of programs, application data, and the like necessary for the control or operation of the remote controller 200.

If the remote control device 200 wirelessly transmits and receives a signal to/from the image display apparatus 100 through the RF module 421, the remote control device 200 and the image display apparatus 100 transmit and receive a signal through a certain frequency band. The controller 480 of the remote control device 200 may store information on a frequency band or the like for wirelessly transmitting and receiving a signal to/from the image display apparatus 100 paired with the remote control device 200 in the storage unit 470 and may refer to the stored information.

The controller 480 may include at least one processor, and may control the overall operation of the remote control device 200 by using the processor included therein.

The controller 480 may transmit a signal corresponding to a certain key operation of the user input unit 430 or a signal corresponding to the motion of the remote control device 200 sensed by the sensor unit 440 to the image display apparatus 100 through the wireless communication unit 420.

The controller 480 may check the power state of the battery included in the power supply unit 460 and transmit a control signal including data on a voltage value of the battery to the image display apparatus 100 through the wireless communication unit 420. For example, when the voltage value of the battery is greater than or equal to a first voltage value (e.g., 2.0V), the controller 480 may transmit the control signal including data on the voltage value of the battery to the image display apparatus 100 through the wireless communication unit 420.

When the voltage value of the battery is less than a second voltage value (e.g., 2.5V), the controller 480 may output a message for requesting battery replacement through the output unit 450. For example, when the voltage value of the battery is greater than or equal to the first voltage value (e.g., 2.0V) and less than the second voltage value (e.g., 2.5V), the controller 480 may transmit the control signal to the image display apparatus 100 and control the LED included in the LED module 451 to be turned on for a predetermined time (e.g., 1 second). For example, when the voltage value of the battery is less than the first voltage value (e.g., 2.0V), the controller 480 may control the LED included in the LED module 451 to be turned on for a predetermined time (e.g., 5 seconds) without transmitting the control signal to the image display device apparatus 100.

The controller 480 may determine whether to replace the battery included in the power supply unit 460. In this case, the controller 480 may transmit a control signal including data indicating that the battery is replaced to the image display apparatus 100. For example, when the battery is replaced, the controller 480 may set a flag value for whether to replace the battery to '1'. Meanwhile, when a control signal in which the flag value for whether to replace the battery is set to '1' is transmitted to the image display apparatus 100, the controller 480 may set the flag value for whether to replace the battery as '0' until the battery is replaced again later.

When the battery is replaced and the voltage value of the battery is greater than or equal to the second voltage value (e.g., 2.5V), the controller 480 may transmit the control signal in which the flag value for whether to replace the battery is set to '1' to the image display apparatus 100, and control the LED included in the LED module 451 to blink a predetermined number of times.

When the battery is replaced and the voltage value of the battery is greater than or equal to the first voltage value (e.g., 2.0V) and less than the second voltage value (e.g., 2.5V), the controller 480 may transmit the control signal in which the flag value for whether to replace the battery is set to '1' to the image display apparatus 100, and control the LED included in the LED module 451 to be turned on for a predetermined time (e.g., 1 second).

When the battery is replaced and the voltage value of the battery is less than the first voltage value (e.g., 2.0V), the controller 480 may control the LED included in the LED module 451 to be turned on for a predetermined time (e.g., 5 seconds) without transmitting the control signal to the image display apparatus 100.

The user input interface 150 of the image display apparatus 100 may include a wireless communication unit 411 that can wirelessly transmit and receive a signal to and from the remote control device 200 and a coordinate value calculator 415 that can calculate the coordinate value of a pointer corresponding to the operation of the remote controller 200.

The user input interface 150 may wirelessly transmit and receive a signal to and from the remote control device 200 through the RF module 412. In addition, the user input interface 150 may receive a signal transmitted by the remote control device 200 through the IR module 413 according to an IR communication standard.

The coordinate value calculator 415 may correct a hand shake or an error from a signal corresponding to the operation of the remote control device 200 received through the wireless communication unit 411 and calculate the coordinate value (x, y) of the pointer 205 to be displayed on the display 180.

The transmission signal of the remote control device 200 inputted to the image display apparatus 100 through the user input interface 150 may be transmitted to the signal processing unit 170 of the image display apparatus 100. The signal processing unit 170 may determine the information on the operation of the remote control device 200 and the key operation from the signal transmitted from the remote controller 200, and, correspondingly, control the image display apparatus 100.

For another example, the remote control device 200 may calculate the pointer coordinate value corresponding to the operation and output it to the user input interface 150 of the image display apparatus 100. In this situation, the user input interface 150 of the image display apparatus 100 may transmit information on the received pointer coordinate value to the signal processing unit 170 without a separate correction process of hand shake or error.

For another example, unlike the drawing, the coordinate value calculator 415 may be provided in the signal processing unit 170, not in the user input interface 150.

Figure 6A:
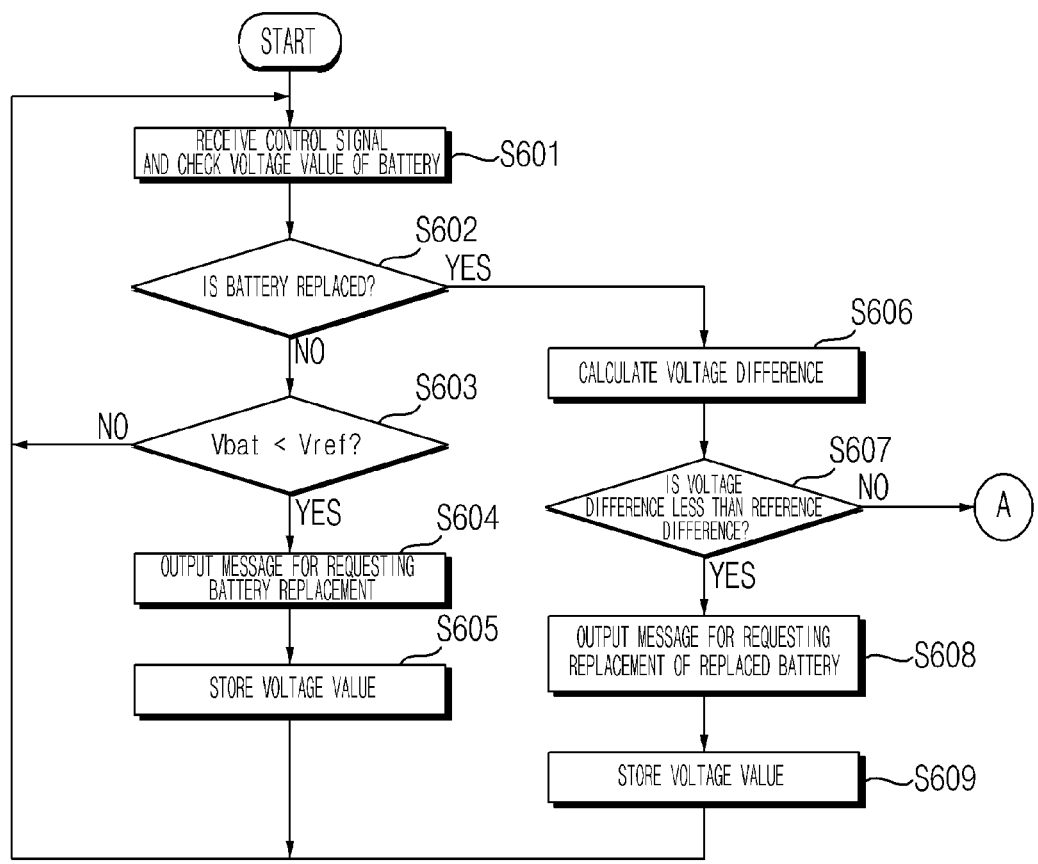
FIGS. 6A and 6B are flowcharts illustrating a method of operating the image display apparatus according to an embodiment of the present disclosure.
Figure 6B:
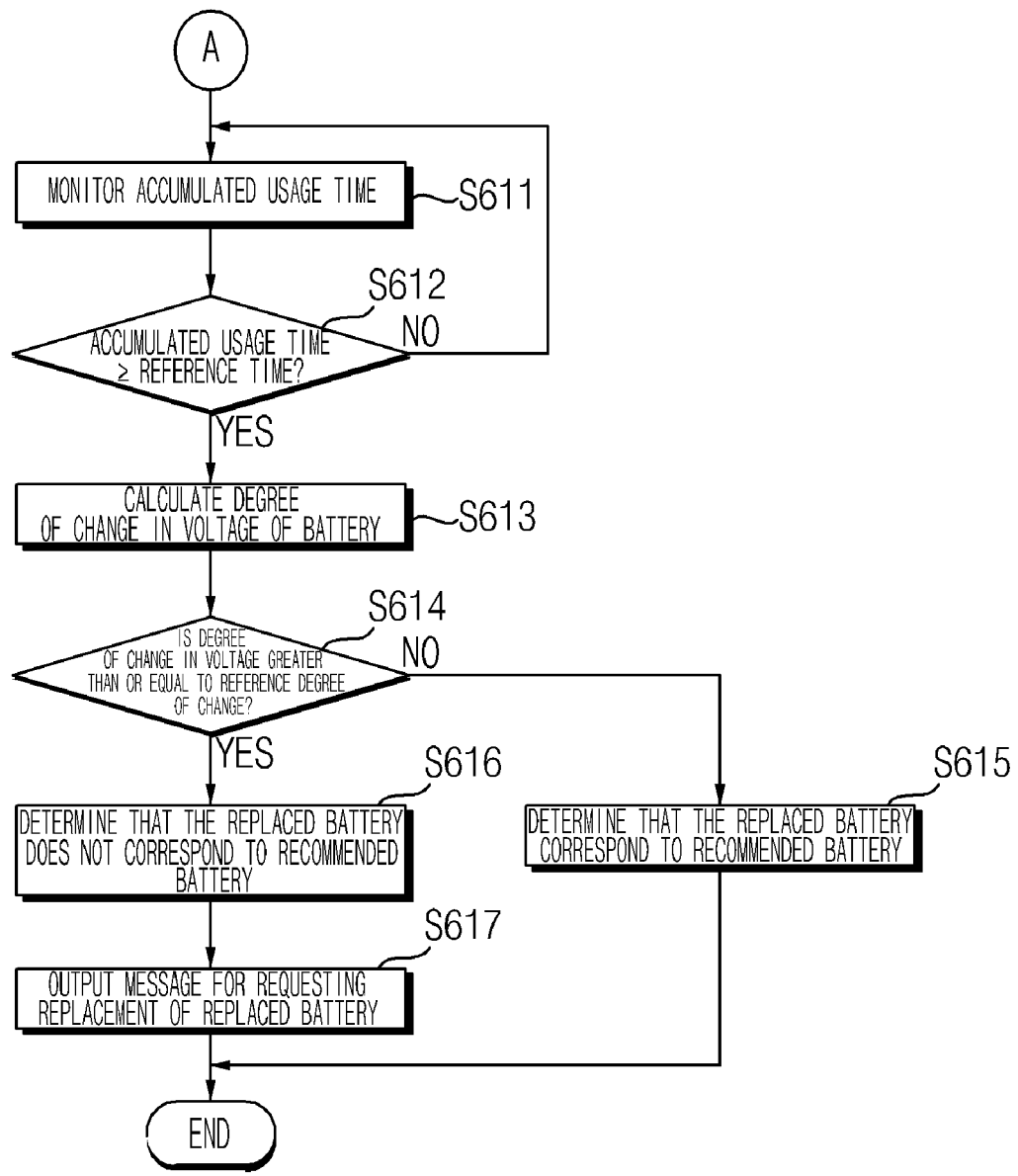

FIGS. 6A and 6B are flowcharts illustrating a method of operating the image display apparatus according to an embodiment of the present disclosure, and FIGS. 7 to 9B are diagrams referenced for explaining a method of operating the image display apparatus.

Referring to FIG. 6A, in operation S601, the image display apparatus 100 may receive a control signal from the remote control device 200 and check the voltage value Vbat of the battery included in the remote control device 200 based on data included in the control signal. For example, the remote control device 200 may transmit a control signal including a Hex value corresponding to the voltage value Vbat of the battery to the image display apparatus 100, and the image display apparatus 100 may check the Hex value included in the control signal to check the voltage value Vbat of the battery included in the remote control device 200.

In operation S602, the image display apparatus 100 may determine whether the battery of the remote control device 200 has been replaced. For example, the image display apparatus 100 may determine that the battery of the remote control device 200 has been replaced when the flag value for whether to replace the battery is '1', and may determine that the battery of the remote control device 200 has not been replaced when the flag value for whether to replace the battery is '0'.

In operation S603, when it is determined that the battery of the remote control device 200 has not been replaced, the image display apparatus 100 may check whether the voltage value Vbat of the battery included in the remote control device 200 is less than a predetermined reference voltage value Vref. Here, the predetermined reference voltage value Vref may mean a voltage value (e.g., 2.5V) that is a reference in determining whether to request battery replacement from the user.

In operation S604, when the voltage value Vbat of the battery included in the remote control device 200 is less than the predetermined reference voltage value Vref, the image display apparatus 100 may output a message for requesting battery replacement.

Figure 7:
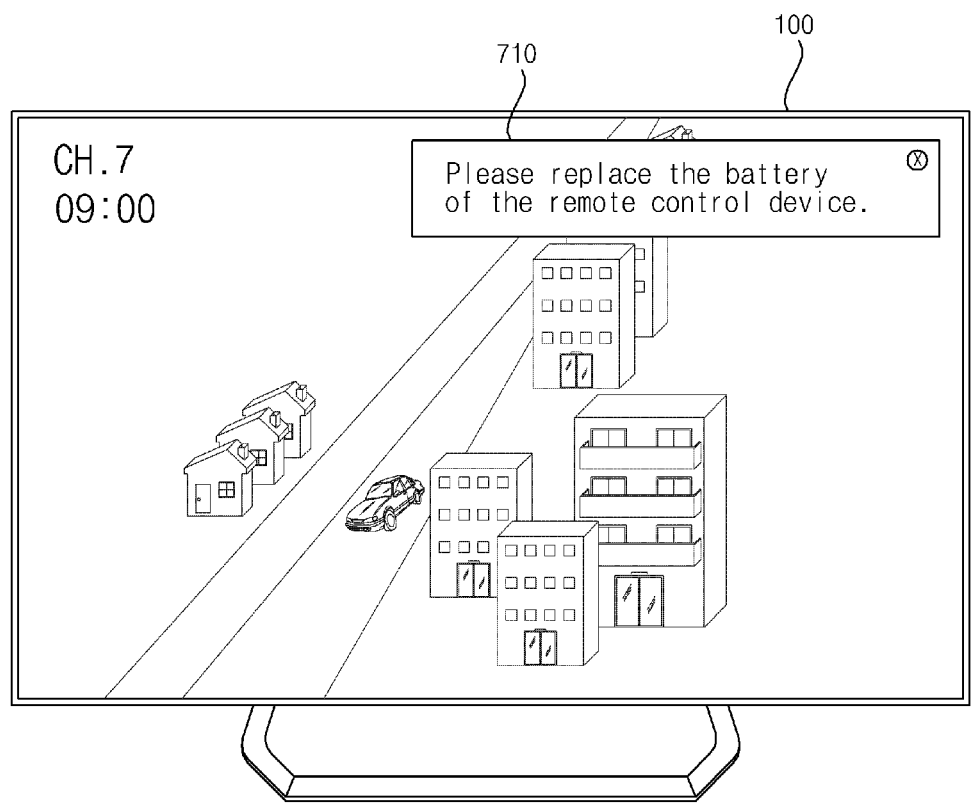
FIGS. 7 to 9B are diagrams referenced for explaining a method of operating the image display apparatus.

Referring to FIG. 7, when the voltage value Vbat of the battery included in the remote control device 200 is less than the predetermined reference voltage value Vref, the image display apparatus 100 may output a first message 710 for requesting battery replacement on at least one area of a screen displayed through the display 180.

Referring to FIG. 6A, in operation S605, the image display apparatus 100 may store the voltage value Vbat of the battery included in the remote control device 200 in the storage unit 140.

Meanwhile, in operation S606, when it is determined that the battery included in the remote control device 200 has been replaced, the image display apparatus 100 may calculate a voltage difference between a voltage value stored in the storage unit 140 and a voltage value included in the control signal. For example, the image display apparatus 100 may calculate a voltage difference Vbat2−Vbat1 between the voltage value Vbat1 most recently stored in the storage unit 140 and the voltage value Vbat2 included in the control signal. In this case, when the voltage value is not stored in the storage unit 140, that is, when the battery is replaced while the voltage value Vbat of the battery included in the remote control unit 200 is equal to or greater than the predetermined reference voltage value Vref (e.g., 2.5V), the image display apparatus 100 may calculate the voltage difference Vbat2−Vbat1 by replacing the voltage value Vbat1 most recently stored in the storage unit 140 with 0V.

In operation S607, the image display apparatus 100 may check whether the calculated voltage difference Vbat2−Vbat1 is less than a predetermined reference difference. Here, the predetermined reference difference may mean a voltage difference (e.g., 0.2V) within an error range of judging that a battery before replacement and a battery after replacement are same.

In operation S608, when the calculated voltage difference Vbat2−Vbat1 is less than the predetermined reference difference (e.g., 0.2V), the image display apparatus 100 may output a message for requesting replacement of the replaced battery.

Figure 8:
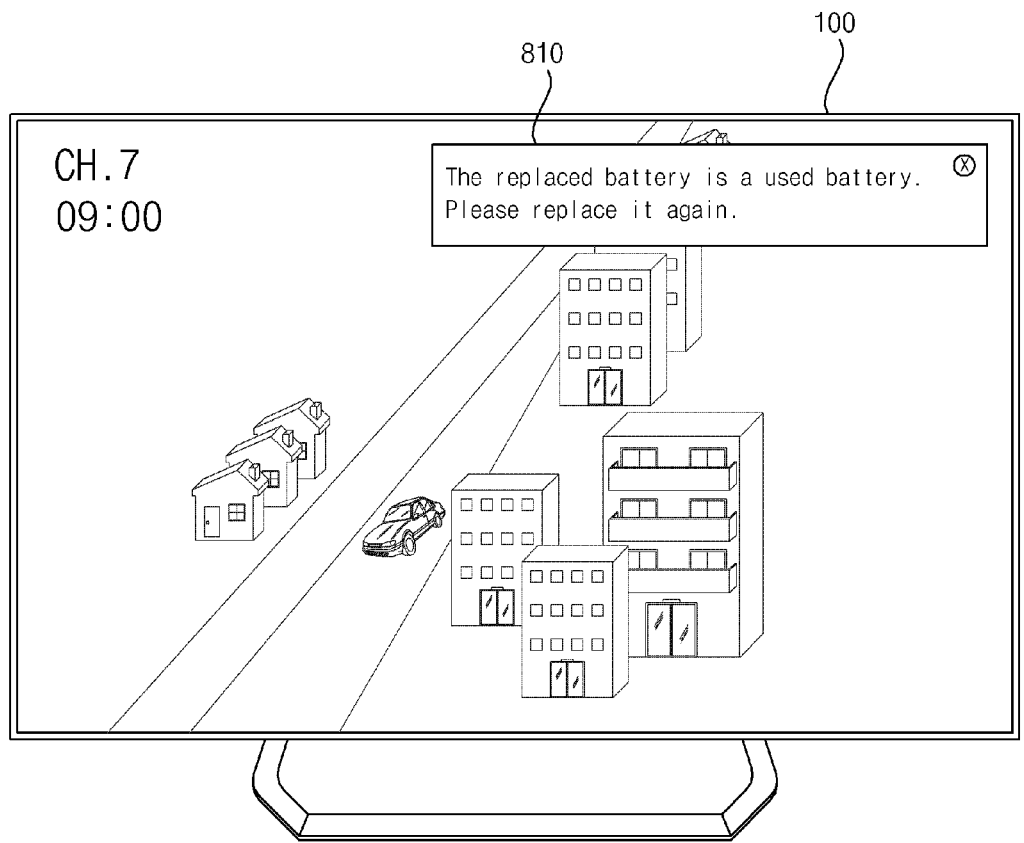
Figure 8:
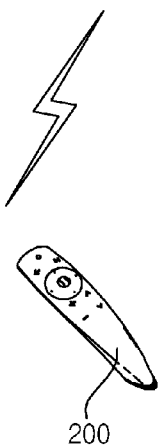

Referring to FIG. 8, when the battery of the remote control device 200 is replaced, but the calculated voltage difference Vbat2−Vbat1 is less than the predetermined reference difference (e.g., 0.2V), the image display apparatus 100 may output a second message 810 for requesting replacement of the replaced battery on at least one area of the screen displayed through the display 180.

Referring to FIG. 6A, in operation S609, the image display apparatus 100 may store the voltage value Vbat of the battery included in the remote control device 200 in the storage unit 140.

Referring to FIG. 6B, in operation S611, when the calculated voltage difference Vbat2−Vbat1 is greater than the predetermined reference difference (e.g., 0.2V), the image display apparatus 100 may monitor an accumulated usage time of the remote control device 200 based on a control signal received from the remote control device 200. Here, the accumulated usage time may mean a time when a user has used the remote control device 200 from a time point when the battery of the remote control device 200 is replaced.

For example, the image display apparatus 100 may monitor the accumulated usage time of the remote control device 200 by accumulating the number and time the control signal is received from the remote control device 200, from the time point when the control signal in which the flag value for whether to replace the battery is set to '1' is received.

In this case, the image display apparatus 100 may include a timer for calculating the accumulated usage time based on the control signal received from the remote control device 200, and may start an operation of the timer to start monitoring the accumulated usage time of the remote control device 200. Here, the timer may be implemented in hardware and controlled by the controller 170, or may be implemented in software and executed by the controller 170.

In operation S612, the image display apparatus 100 may check whether the accumulated usage time of the remote control device 200 is equal to or more than a predetermined reference time (e.g., 5 minutes).

When the accumulated usage time of the remote control device 200 is less than the predetermined reference time (e.g., 5 minutes), the image display apparatus 100 may continuously monitor the accumulated usage time based on the control signal received from the remote control device 200 in operation S611.

In operation S613, when the accumulated usage time of the remote control device 200 is equal to or more than the predetermined reference time (e.g., 5 minutes), the image display apparatus 100 may calculate a degree of change in voltage of the replaced battery during the accumulated usage time. For example, the image display apparatus 100 may calculate the degree of change in voltage of the replaced battery during the accumulated usage time based on a difference between a voltage value of the battery at the time the battery is replaced and a voltage value of the battery at the time when the accumulated usage time is equal to or more than the predetermined reference time (e.g., 5 minutes).

In this case, when the degree of change in voltage of the replaced battery is calculated, the image display apparatus 100 may terminate the operation of the timer and initialize the accumulated usage time of the remote control device 200.

In operation S614, the image display apparatus 100 may check whether the degree of change in voltage of the replaced battery is greater than or equal to a predetermined reference degree of change. Here, the predetermined reference degree of change may correspond to the maximum degree of change when a battery which type is a recommended type for use (hereinafter, referred to as a recommended battery) is mounted in the remote control device 200 and the remote control device 200 is used for the predetermined reference time (e.g., 5 minutes).

In addition, in the description of the present disclosure, as an example, the type of the recommended battery is an alkaline battery and the type of the battery that is not recommended for use is a manganese battery, and it will be described as checking whether the degree of change in voltage of the replaced battery is greater than or equal to the predetermined reference degree of change. However, the present disclosure is not limited thereto, and the relationship between the degree of change in voltage of the replaced battery and the predetermined reference degree of change may vary according to the type of the recommended battery and the type of the battery that is not recommended for use.

In operation S615, when the degree of change in voltage of the replaced battery is less than the predetermined reference degree of change, the image display apparatus 100 may determine that the replaced battery corresponds to the recommended battery.

On the other hand, in operations S616 and S617, when the degree of change in voltage of the replaced battery is greater than the predetermined reference degree of change, the image display apparatus 100 may determine that the replaced battery does not correspond to the recommended battery, and may output a message for requesting replacement of the replaced battery.

Figure 9A:
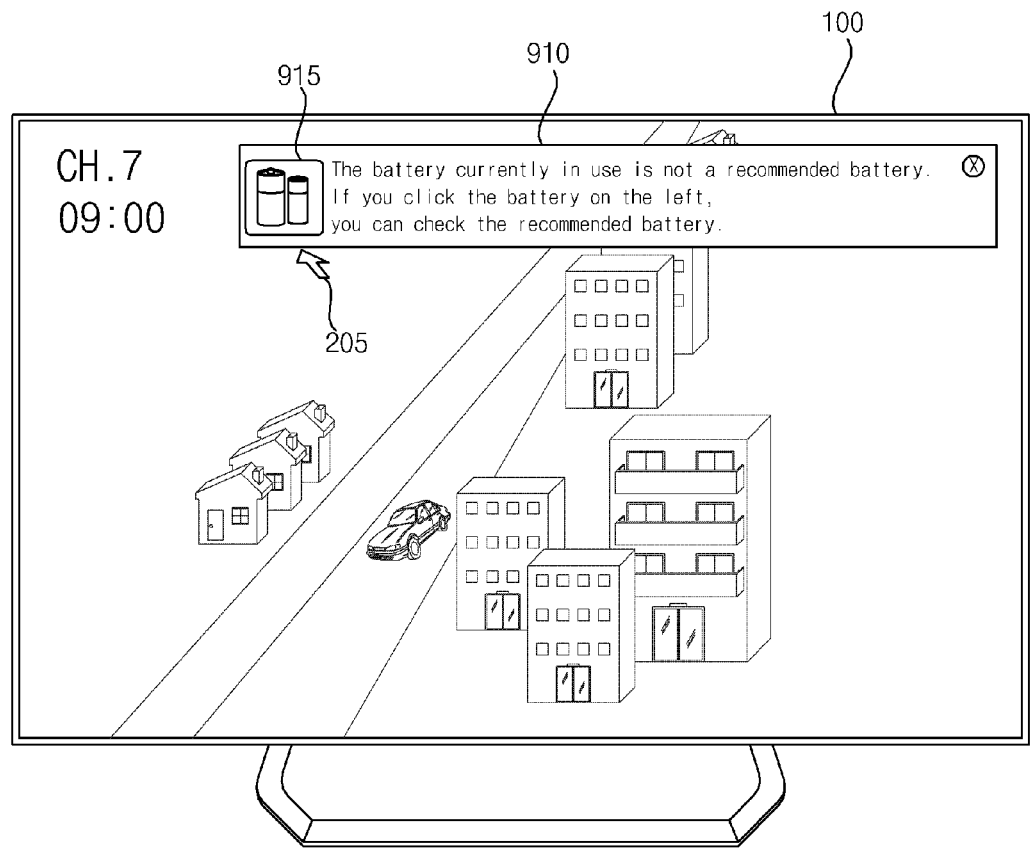
Figure 9A:
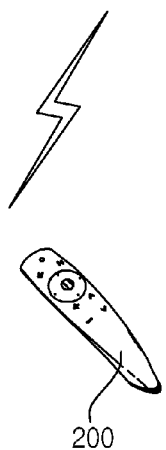

Referring to FIG. 9A, when the replaced battery does not correspond to the recommended battery, the image display apparatus 100 may output a third message 910 for requesting replacement with the recommended battery on at least one area of a screen displayed through the display 180.

In this case, the image display apparatus 100 may output an item 915 to which a web page related to purchasing the recommended battery is linked together with the third message 910.

Meanwhile, when the user selects the item 915 using the pointer 205 displayed on the display 180, the image display apparatus 100 may receive a user input signal corresponding to the selection of the item 915 through the user input interface 150, and may output a web page screen related to purchasing the recommended battery linked to the item 915 through the display 180.

Figure 9B:
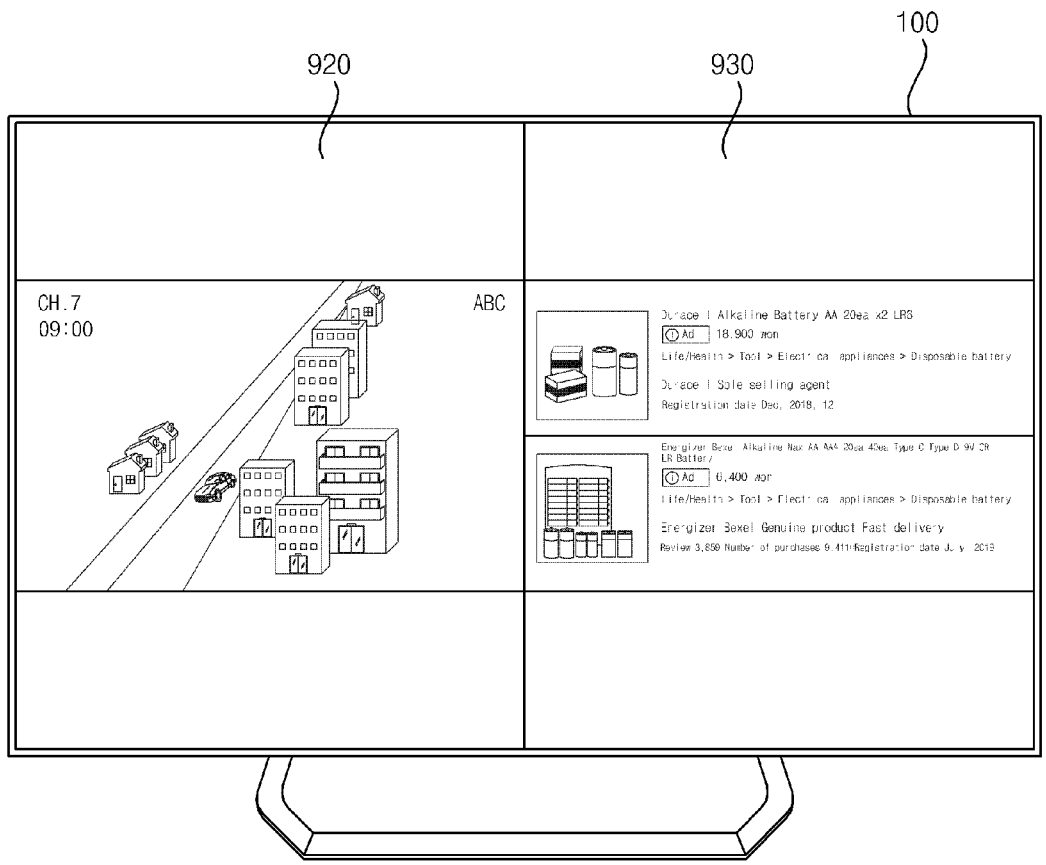

Referring to FIG. 9B, when the user input signal corresponding to selection of the item 915 is received, the image display apparatus 100 may output content that the user is watching through the one area 920 of the display 180, and may output a web page screen related to purchasing the recommended battery through another area 930 of the display 180.

Meanwhile, the image display apparatus 100 may transmit various data related to the battery included in the remote control device 200 to the server 400 through the network interface 135.

For example, when the voltage value Vbat of the battery included in the remote control device 200 is less than the predetermined reference voltage value Vref, the image display apparatus 100 may transmit data corresponding to the first message 710 for requesting battery replacement to the server 400.

For example, when the battery of the remote control device 200 is replaced, but the calculated voltage difference Vbat2−Vbat1 is less than the predetermined reference difference (e.g., 0.2V), the image display apparatus 100 may transmit data corresponding to the second message 810 for requesting replacement of the replaced battery to the server 400.

For example, when the replaced battery does not correspond to the recommended battery, the image display apparatus 100 may transmit data corresponding to the third message 910 for requesting replacement with the recommended battery to the server 400.

When various data related to the battery included in the remote control device 200 are received from the image display apparatus 100, the server 400 may transmit various information about the battery included in the remote control device 200 to a user's portable terminal device as a push message. In this case, the push message received by the user's portable terminal device may be displayed through a display of the user's portable terminal device in the form of a pop-up window.

For example, when data corresponding to the first message 710 for requesting battery replacement and/or the second message 810 for requesting replacement of the replaced battery is received from the image display apparatus 100, the server 400 may transmit a push message for battery replacement to the user's portable terminal device. In this case, the push message for battery replacement may be displayed through the display of the user's portable terminal device in the form of the pop-up window.

For example, when data corresponding to the third message 910 for requesting replacement with the recommended battery from the image display apparatus 100 is received, the server 400 may transmit a push message for requesting replacement with the recommended battery to the user's portable terminal device. In this case, the server 400 may transmit link information on the web page related to purchasing the recommended battery to the user's portable terminal device together with the push message for requesting replacement with the recommended battery. In addition, when the user selects link information displayed in a pop-up window displayed on the display of the portable terminal device, a web page screen related to purchasing the recommended battery may be displayed through the display of the portable terminal device.

According to various embodiments of the present disclosure, based on data included in a control signal received from the remote control device 200, a voltage value of the battery of the remote control device 200 may be checked to determine a replacement time of the battery. In addition, by comparing the voltage value of the battery before replacement and the voltage value of the battery after replacement, it is possible to determine whether the replaced battery is the used battery. Through this, information on a state of the battery can be accurately provided to the user, and the usability and reliability of the product can be improved.

Furthermore, according to various embodiments of the present disclosure, based on the degree of change in voltage of the replaced battery for a predetermined period of time, it is possible to determine whether the type of the replaced battery is a type recommended for use, and request the user to replace the battery mounted in the remote control device, thereby further improving the reliability of the product.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of the server and the system including the same according to the present disclosure can be realized as a processor-readable code written on a recording medium readable by a processor included in the server and the system including the same. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus comprising:
a display;
an external device interface including at least one communication module, the external device interface being configured to communicate with a remote control device using short-range communication;
a memory; and
a controller configured to check a voltage value of a battery included in the remote control device based on data included in a control signal received from the remote control device,
wherein the controller is configured to:
when the control signal includes data indicating that the battery is replaced, calculate a degree of change in voltage of the replaced battery during an accumulated usage time of the remote control device,
determine whether the replaced battery corresponds to a recommended battery based on the degree of change in voltage of the replaced battery, and
cause the display to display a message for requesting replacement with the recommended battery through the display based on a determination that the replaced battery does not correspond to the recommended battery.

2. The image display apparatus according to claim 1, wherein the controller is configured to:
based on the voltage value of the battery being less than a predetermined reference voltage value, store the voltage value of the battery in the memory and output a first message for requesting battery replacement through the display, and
output a second message for requesting replacement of the replaced battery through the display when the replaced battery needs to be replaced.

3. The image display apparatus according to claim 2, wherein the controller is configured to:
calculate a voltage difference between a voltage value most recently stored in the memory and the voltage value included in the control signal; and
when the voltage difference is greater than or equal to the predetermined reference difference, calculate the degree of change in voltage of the replaced battery; and
when the degree of change in voltage of the replaced battery is different from a predetermined reference degree of change, determine that the replaced battery does not correspond to the recommended battery.

4. The image display apparatus according to claim 1, wherein the controller is configured to output an item to which a web page related to purchasing the recommended battery is linked together with the message for requesting replacement with the recommended battery.

5. The image display apparatus according to claim 3, further comprising a timer configured to calculate the accumulated usage time based on the control signal,
wherein the controller is configured to:
when the voltage difference is greater than or equal to the predetermined reference difference, control the timer to start an operation and monitor the accumulated usage time from the time the battery is replaced; and
calculating the degree of change in voltage of the replaced battery during the accumulated usage time.

6. The image display apparatus according to claim 5, wherein the controller is configured to terminate the operation of the timer and initialize the accumulated usage time when the degree of change in voltage of the replaced battery is calculated.

7. The image display apparatus according to claim 3, further comprising a network interface configured to communicate with a server,
wherein the controller is configured to:
when the voltage value of the battery is less than the predetermined reference voltage value, transmit data corresponding to the first message to the server;
when the replaced battery needs to be replaced, transmit data corresponding to the second message to the server; and
when the replaced battery does not correspond to the recommended battery, transmit data corresponding to the message for requesting replacement with the recommended battery to the server.

8. A method of an image display apparatus, the method comprising:
checking a voltage value of a battery included in a remote control device based on data included in a control signal received from the remote control device;
when the control signal includes data indicating that the battery is replaced, calculating a degree of change in voltage of the replaced battery during an accumulated usage time of the remote control device, determining whether the replaced battery corresponds to a recommended battery based on the degree of change in voltage of the replaced battery, and displaying a message for requesting replacement with the recommended battery through a display of the image display apparatus based on a determination that the replaced battery does not correspond to the recommended battery.

9. The method according to claim 8, further comprising:

when the voltage value of the battery is less than a predetermined reference voltage value, storing the voltage value of the battery in a memory of the image display apparatus and outputting a message for requesting battery replacement through the display;

calculating a voltage difference between a voltage value most recently stored in the memory and the voltage value included in the control signal;

when the voltage difference is greater than or equal to a predetermined reference difference, calculating the degree of change in voltage of the replaced battery; and when the degree of change in voltage of the replaced battery is different from a predetermined reference degree of change, determining that the replaced battery does not correspond to the recommended battery.

* * * * *